US012104919B2

(12) United States Patent
Bonnet et al.

(10) Patent No.: US 12,104,919 B2
(45) Date of Patent: Oct. 1, 2024

(54) METHOD AND DEVICE FOR PREDICTING A WEATHER CONDITION ON A ROAD NETWORK

(71) Applicant: Continental Automotive GmbH, Hannover (DE)

(72) Inventors: Jonathan Bonnet, Toulouse (FR); Nicolas Renard, Toulouse (FR); Christophe Adonis, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 261 days.

(21) Appl. No.: 17/393,970

(22) Filed: Aug. 4, 2021

(65) Prior Publication Data
US 2022/0042819 A1    Feb. 10, 2022

(30) Foreign Application Priority Data

Aug. 10, 2020    (FR) ...................................... 2008390

(51) Int. Cl.
*G01C 21/36*    (2006.01)
*G01W 1/10*    (2006.01)

(52) U.S. Cl.
CPC ........... *G01C 21/3694* (2013.01); *G01W 1/10* (2013.01)

(58) Field of Classification Search
CPC ..... G01W 1/10; G01W 1/00; G01W 2203/00; G08G 1/0141; G08G 1/096716; G08G 1/096775; G08G 1/0112; G08G 1/0129; G01C 21/3694
See application file for complete search history.

(56) References Cited

U.S. PATENT DOCUMENTS 6,317,686 B1    11/2001    Ran
6,603,405 B2 *    8/2003    Smith .................. G08G 1/0962
                                                                        340/602

(Continued)

FOREIGN PATENT DOCUMENTS

EP    2172377 A1    4/2010
EP    2757539 A1    7/2014
EP    3581454 A1    12/2019

OTHER PUBLICATIONS

French Search Report for French Application No. 2008390, dated Apr. 20, 2021, 7 pages.

*Primary Examiner* — Stephen Holwerda
(74) *Attorney, Agent, or Firm* — Buchanan Ingersoll & Rooney PC

(57) ABSTRACT

A method for predicting a weather condition at a particular location in a road network extending over at least one weather area divided into a plurality of weather cells, the method including steps of obtaining, from a weather forecast provider, a first data item relating to a general weather forecast for the weather area, and receiving, from a first vehicle travelling in a first weather cell, a second data item relating to an alteration of a weather condition detected by at least one sensor of the vehicle. The prediction method is remarkable in that it further includes steps of predicting a probability of a weather condition for at least one target weather cell by applying a prediction model associated with the target cell to at least the first data item and the second data item, and of transmitting the predicted weather condition to at least one second vehicle.

17 Claims, 6 Drawing Sheets

(56) References Cited

U.S. PATENT DOCUMENTS

| | | | |
|---|---|---|---|
| 6,711,493 B1* | 3/2004 | Andrews | G08G 1/0104 |
| | | | 340/904 |
| 2002/0067289 A1* | 6/2002 | Smith | G08G 1/0962 |
| | | | 340/905 |
| 2008/0003037 A1 | 1/2008 | Onoda | |
| 2008/0030370 A1 | 2/2008 | Doyle | |
| 2009/0312943 A1* | 12/2009 | Kelly | G01C 21/26 |
| | | | 701/465 |
| 2014/0002277 A1* | 1/2014 | Fulger | H04W 4/029 |
| | | | 340/905 |
| 2015/0088835 A1* | 3/2015 | Davis | G06F 11/08 |
| | | | 707/690 |
| 2015/0356867 A1* | 12/2015 | Bogren | G08G 1/0133 |
| | | | 340/905 |
| 2016/0343093 A1* | 11/2016 | Riland | G06Q 50/06 |
| 2017/0349148 A1 | 12/2017 | Bojanowski et al. | |
| 2018/0073879 A1 | 3/2018 | Hakeem et al. | |

\* cited by examiner

[Fig. 1]
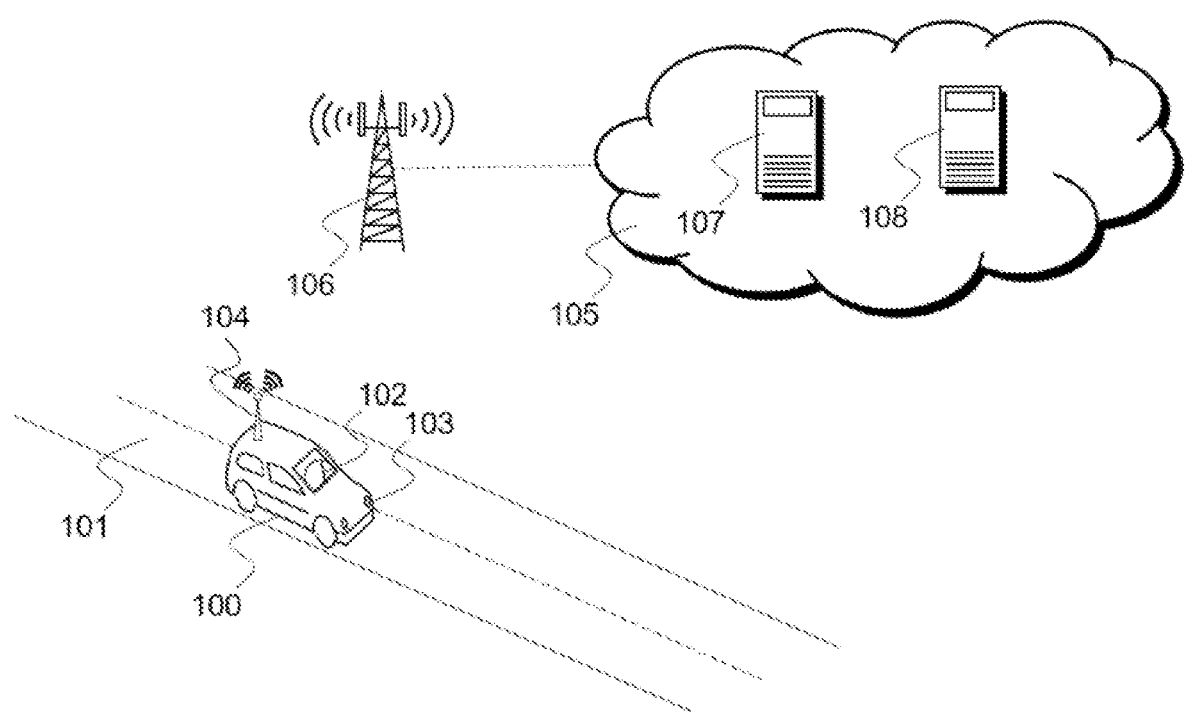

[Fig. 2A]
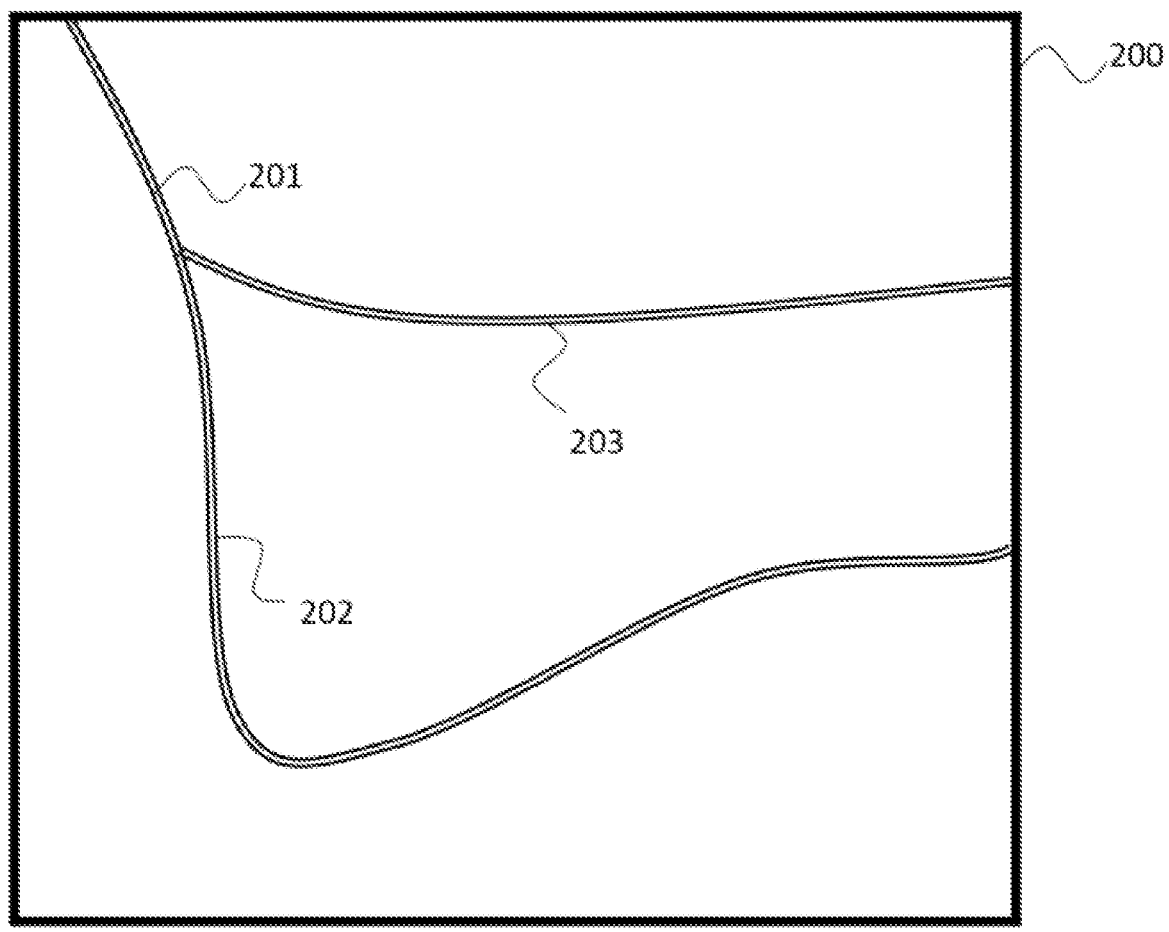

[Fig. 2B]
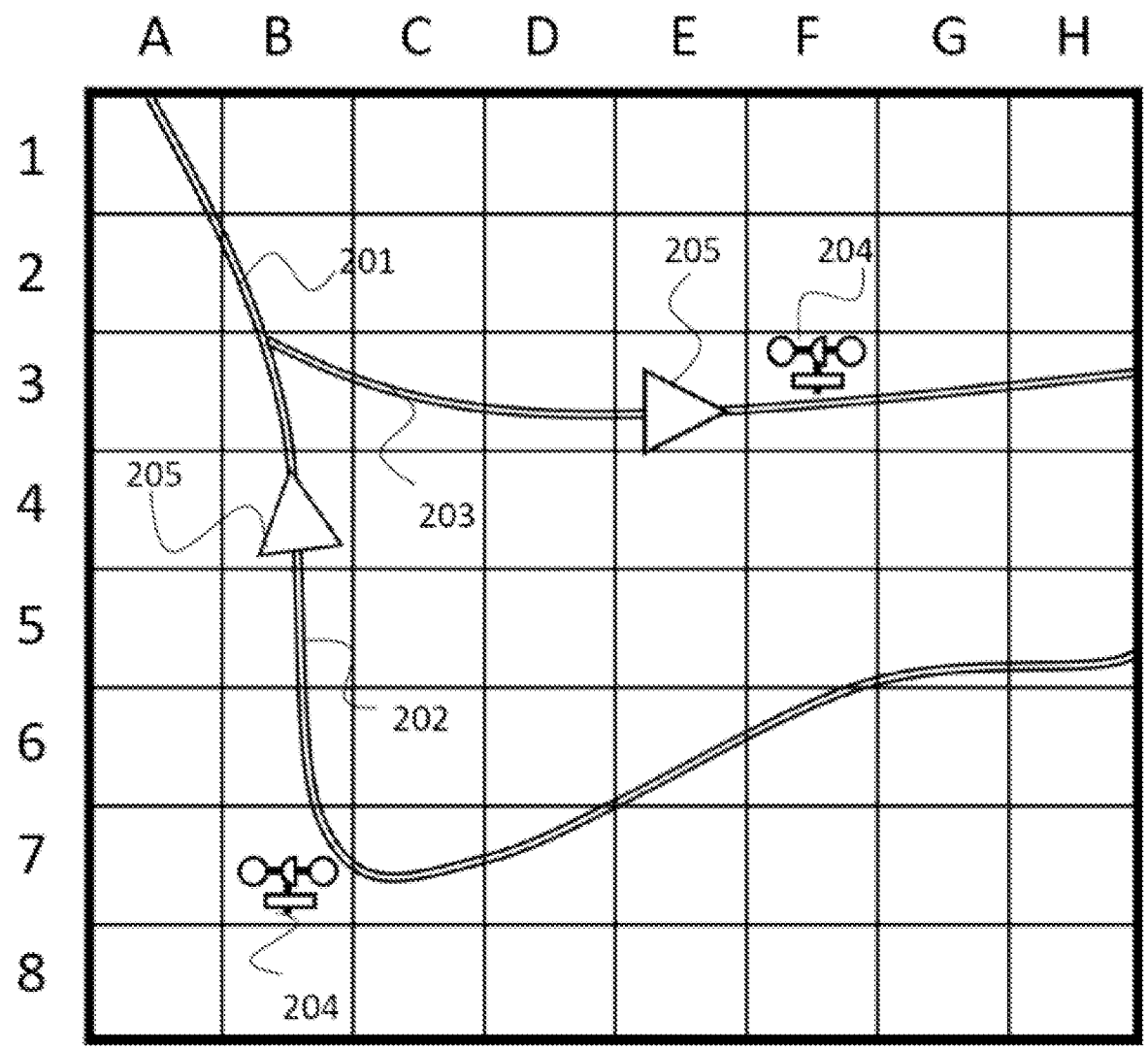

[Fig. 3]
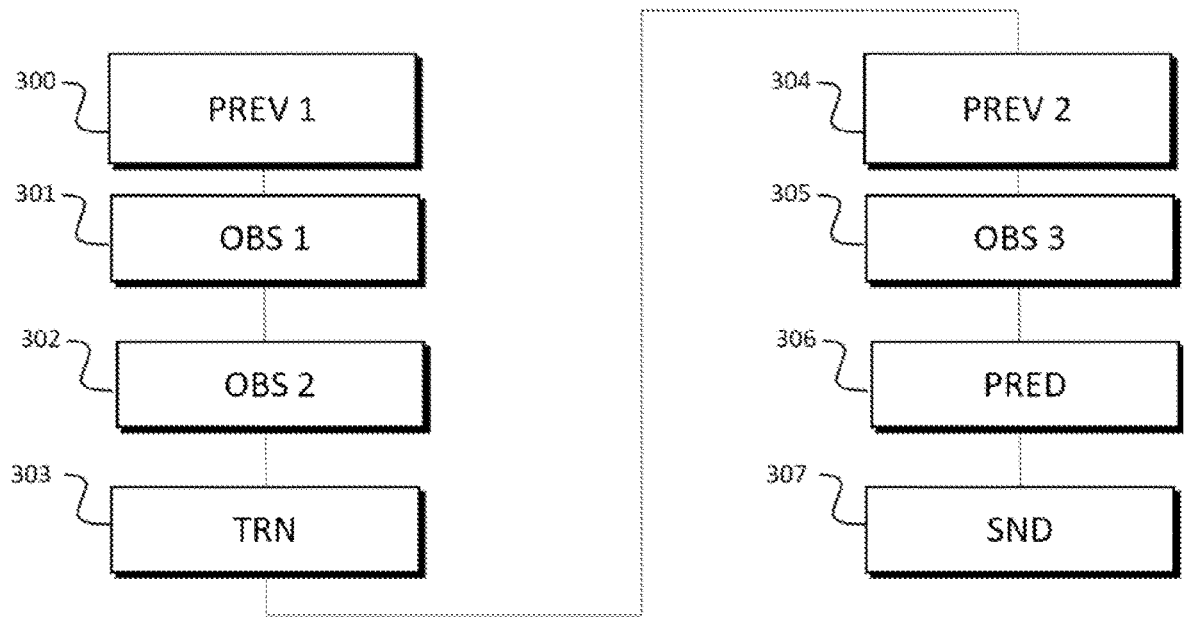
[Fig. 4A]
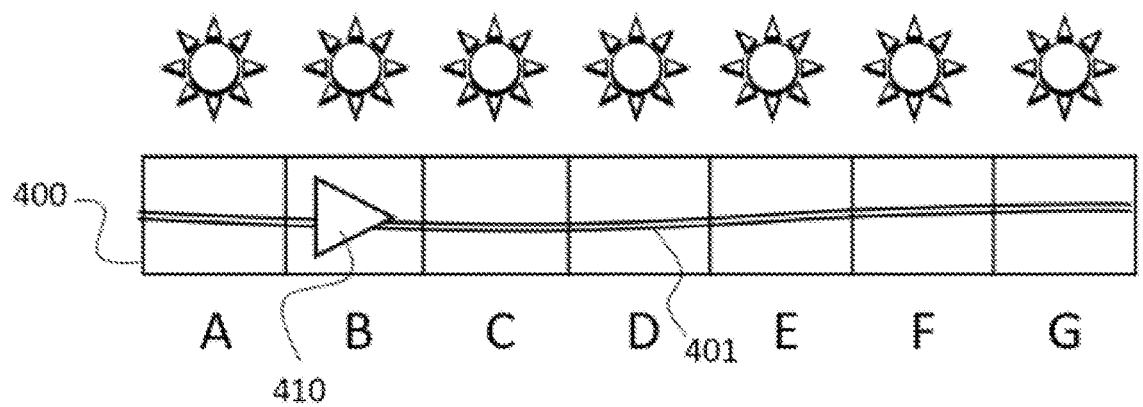

[Fig. 4B]
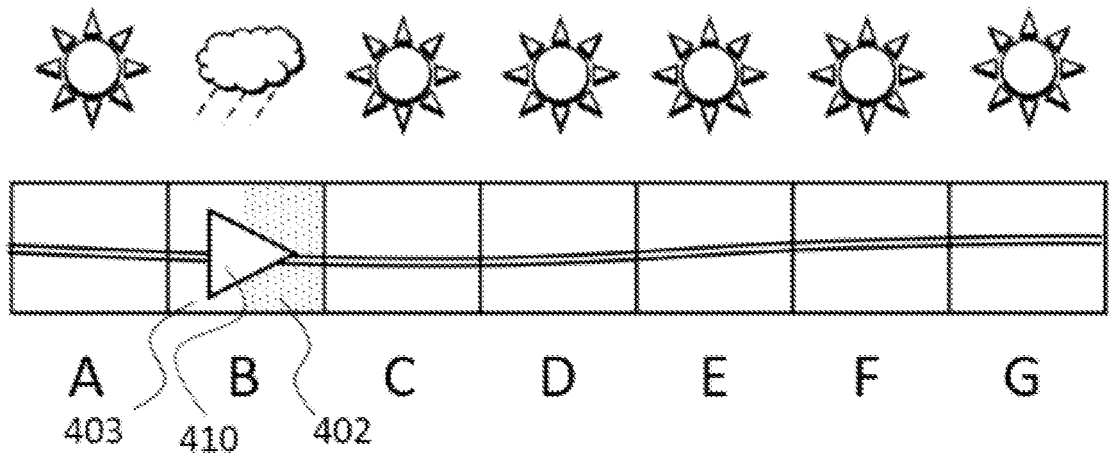
[Fig. 4C]
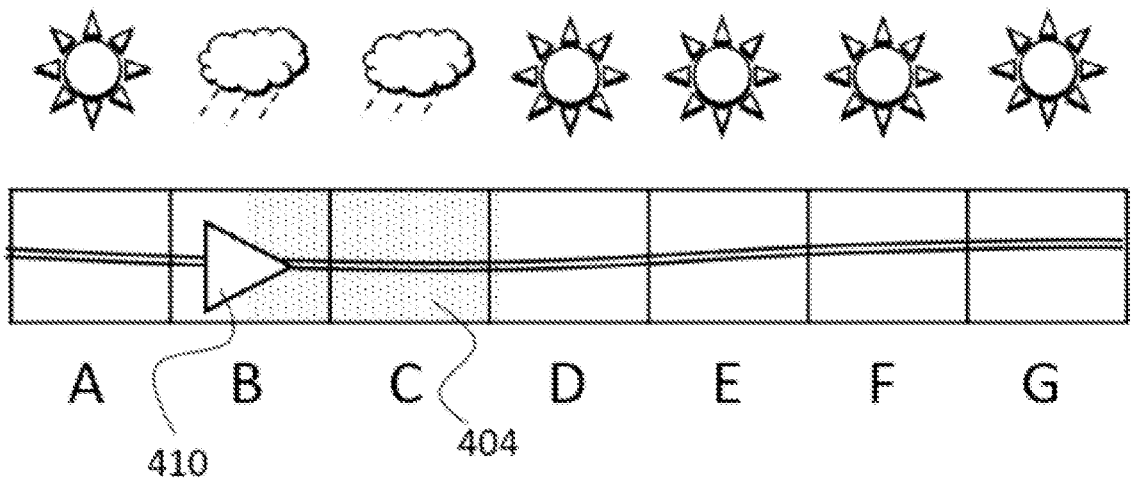
[Fig. 4D]
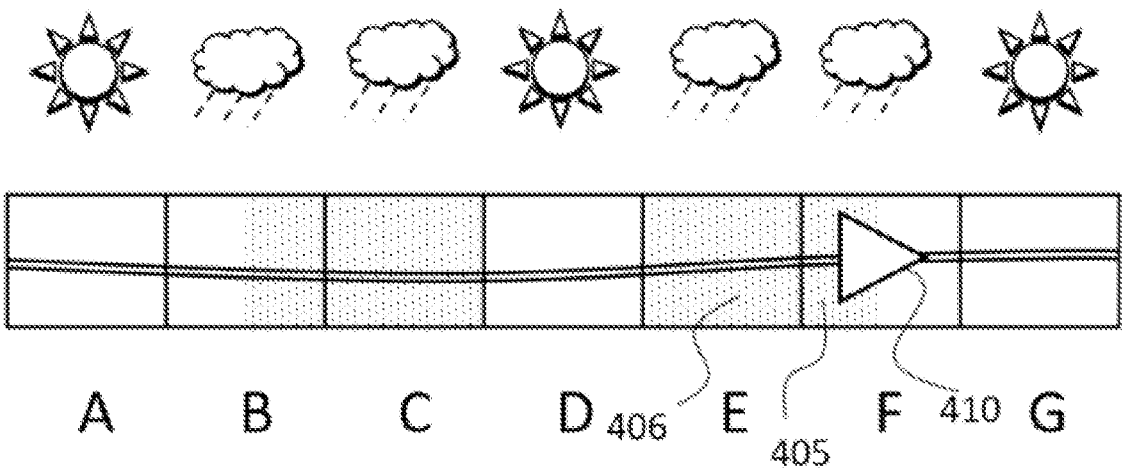

[Fig. 4E]
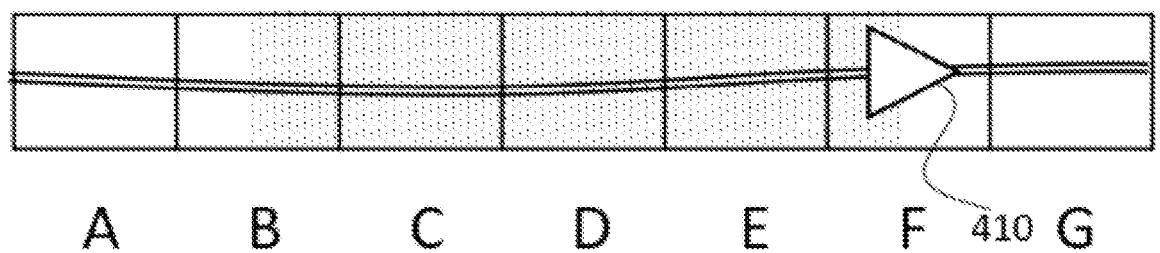
A    B    C    D    E    F  410  G
[Fig. 5]
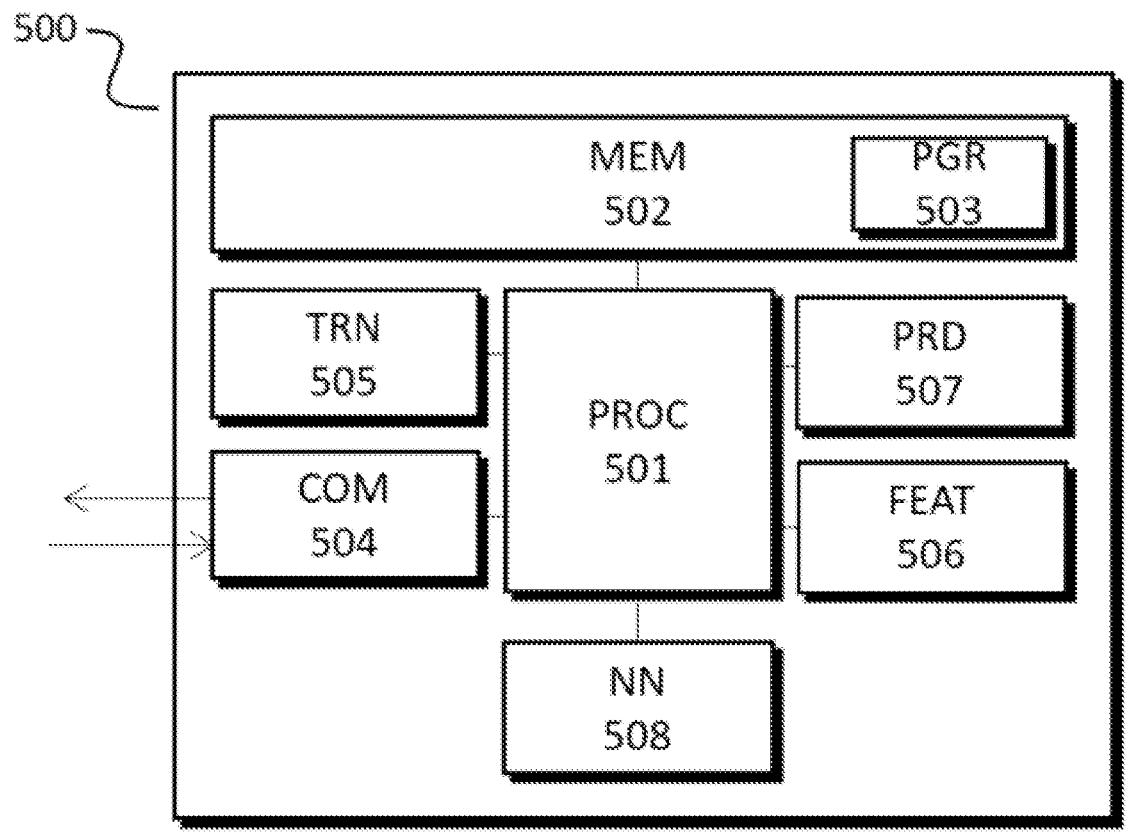

METHOD AND DEVICE FOR PREDICTING A WEATHER CONDITION ON A ROAD NETWORK

CROSS REFERENCE TO RELATED APPLICATIONS

This application claims priority to French Patent Application No. 2008390, filed Aug. 10, 2020, the contents of such application being incorporated by reference herein.

BACKGROUND OF THE INVENTION

Weather conditions are an important factor in road safety. Furthermore, some autonomous driving functions should not be used in particular weather conditions, for example in the event of rain or the risk of black ice.

Weather forecast providers offer geolocated predictions with a spatial resolution in the order of one kilometer, which are updated at frequencies in the order of around fifteen minutes.

However, these weather forecasts do not have the accuracy required in order to predict very localized events, such as for example a shower or a fog bank. This is because these predictions are provided for a large area that does not take account of local characteristics.

Techniques are also known that allow localized weather events to be detected. For example, the patent application US20080030370, incorporated herein by reference, proposes detecting weather conditions on the basis of the activation state of equipment items on vehicles travelling on a road network. According to this method, the activation state of a windshield wiper is transmitted by vehicles travelling on a road network. On the basis of these data, the server can calculate an area of bad weather and inform other vehicles of these weather conditions.

However, detecting bad weather based only on the activation state of equipment items in the vehicle can lead to errors. For example, a driver can forget to switch off his fog lights after having come through a fog bank, or the windshield wipers can be used to clean a dirty windshield while it is not raining.

There is thus a need to improve the accuracy of predictions, and in particular to increase the spatial resolution of weather predictions.

SUMMARY OF THE INVENTION

For this purpose, a method for predicting a weather condition at a particular location in a road network extending over at least one weather area divided into a plurality of weather cells is proposed, the method comprising the following steps:
  obtaining, from a weather forecast provider, a first data item relating to a general weather forecast for said weather area,
  receiving, from a first vehicle travelling in a first weather cell, a second data item relating to an alteration of a weather condition detected by at least one sensor of the vehicle.

The prediction method is remarkable in that it further includes steps of:
  predicting a probability of a weather condition for at least one target weather cell by applying a prediction model associated with the target cell to at least the first data item and the second data item, and
  transmitting the predicted weather condition to at least one second vehicle.

Thus, by applying a prediction model to a general weather forecast for the region and a data item relating to an alteration of a weather condition detected in at least one particular cell adjacent to a current cell, the method allows prediction of a weather condition in the current cell with improved accuracy compared to the prior art. Here, "change in a weather condition" is understood to mean an alteration of at least one weather parameter, for example crossing from dry weather to rainy weather or vice versa, entry into or exit from a fog bank, a significant alteration of an outside temperature, etc. When a vehicle transmits data that are characteristic of such a change of weather condition, the data are used to refine a general weather forecast for the region to which the weather cell in which the change is detected belongs, that is to say to improve the spatial and temporal resolution of the forecast. To that end, the proposal is to implement a prediction model trained to take advantage of the detection of a weather front in one or more weather cells in order to improve the accuracy and reliability of a weather forecast for other adjacent cells belonging to the same region.

A cell is said to be adjacent to a current cell when it belongs to the same weather region for which a general forecast can be obtained and when the distance separating it from the current cell is below a threshold. For example, an adjacent cell is an adjoining cell, or else a cell separated from the current cell by one or more other cells.

The method thus allows a weather condition at the location of the second vehicle to be predicted. Of course, the prediction can be transmitted to a plurality of second vehicles, including to the first vehicle. For example, the prediction can be transmitted in the form of a weather map, the accuracy of which is improved by predictions made for a plurality of current cells of a weather area, and transmitted or provided to a plurality of vehicles travelling in proximity to or in the weather area.

According to one particular implementation, the method comprises a prior phase of training the prediction model associated with the target weather cell, the training comprising at least the following steps:
  obtaining a third data item comprising a general weather forecast relating to said weather area, and
  obtaining a fourth data item relating to an alteration of a weather condition in at least one first cell of the weather area, the alteration being detected at a first time by at least one sensor of a vehicle travelling in the first cell, and
  training the prediction model on the basis of a characteristic vector comprising at least the third data item and the fourth data item, and on the basis of a target data item relating to a weather observation obtained for a second time in the target weather cell of the weather area.

Thus, the proposal is to train the prediction model to predict a weather condition in a particular cell on the basis of a general weather forecast for the region comprising the cell and on the basis of a data item relating to a change of weather condition detected by a vehicle travelling in a current cell. The data item relating to a change of weather condition comprises at least a first and a second weather condition, which are detected successively by a vehicle while it is travelling in a cell. Such a data item allows a weather front, for example a rain front delimiting an area without rain from a rainy area, to be characterized. The training method thus allows correlations to be established between the characteristics of such a weather front, a general weather forecast and a target weather condition actually recorded in at least one other cell of the geographical area.

The alteration of weather condition detected in the first cell and the weather observation in the second cell can be made by a single vehicle or by distinct vehicles.

According to one particular implementation, the third data item, the fourth data item and the target data item, on the basis of which the model is trained, relate to times in one and the same time window, the duration of which is below a predefined threshold.

A reduced time range allows a better correlation to be established between the alteration of weather condition in a first cell and the weather condition observed in the second cell. The reliability of predictions is thus improved.

In one particular embodiment, the method is such that a data item relating to an alteration of a weather condition comprises at least:
- a first activation state of at least one equipment item of the vehicle,
- a second activation state of the at least one equipment item of the vehicle,
- a direction of movement of the vehicle.

The proposal is to determine an alteration of a weather condition on the basis of the activation, deactivation or more generally a change of state of an equipment item of a vehicle. In this way, it is possible to indirectly determine the characteristics of a weather front by using standard equipment items on a vehicle.

The direction of travel of the vehicle that has performed the detection allows greater characterization of the weather front by providing information about its orientation. Such a data item allows prediction to be improved by strengthening the correlations in the model.

According to one particular implementation, the method is such that the first activation state and the second activation state relate to at least one equipment item of the vehicle selected from among the equipment items on the following list:
- a windshield wiper of the vehicle,
- a headlamp of the vehicle,
- a rain sensor of the vehicle,
- a microphone,
- a thermometer.

Thus, the first and second activation states of the vehicle can relate to a windshield wiper. The fact that a windshield wiper is in a first inactive state then in a second active state, or vice versa, allows the inference to be made that the vehicle is passing through a weather front. Likewise, the switching on or switching off of the headlamps of a vehicle, or the state of a rain sensor, allows the inference to be made that a weather condition encountered by the vehicle has changed. Some vehicles may be equipped with an exterior microphone allowing the running noise of the vehicle to be analyzed in order to determine a surface condition of the vehicle. The state of such a microphone also allows the inference to be made that the vehicle is passing through a weather front. According to another example, a sudden change of outside temperature measured by a thermometer can also be used to infer a change of weather condition.

According to another aspect, the invention relates to a device for predicting a weather condition at a particular location in a road network extending over at least one weather area divided into a plurality of weather cells, the device comprising a communication interface, a memory and a processor, the processor and the communication interface being configured by instructions recorded in the memory to implement the following steps:
- obtaining, from a weather forecast provider, a first data item relating to a general weather forecast for said weather area,
- receiving, from a first vehicle travelling in a first weather cell, a second data item relating to an alteration of a weather condition detected by at least one sensor of the vehicle.

The prediction device is remarkable in that the processor and the communication interface are further configured by instructions recorded in the memory to implement steps of:
- predicting a probability of a weather condition for at least one second weather cell by applying a prediction model to at least the first data item and the second data item, and
- transmitting the predicted weather condition to at least one second vehicle.

According to one particular embodiment, the device is such that the processor and the communication interface are further configured by instructions recorded in the memory and suitable for implementing a prior training of the prediction model according to at least the following steps:
- obtaining a third data item comprising a general weather forecast relating to said weather area, and
- obtaining a fourth data item relating to an alteration of a weather condition in at least one first cell of the weather area, the alteration being detected at a first time by at least one sensor of a vehicle travelling in the first cell,
- training the prediction model on the basis of a characteristic vector comprising at least the third data item and the fourth data item, and on the basis of a target data item relating to a weather observation obtained for a second time in at least one second weather cell of the weather area.

An aspect of the invention also relates to a server comprising a prediction device as described above.

According to yet another aspect, the invention relates to a data medium containing computer-program instructions configured to implement the steps of a prediction method as described above when the instructions are executed by a processor.

The data medium may be a nonvolatile data medium such as a hard disk, a flash memory or an optical disk, for example.

The data medium may be any entity or device capable of storing instructions. For example, the medium may comprise a storing means, such as a ROM, RAM, PROM, EPROM, a CD ROM or else a magnetic recording means, for example a hard disk.

Furthermore, the data medium may be a transmissible medium such as an electrical or optical signal, which may be transmitted via an electrical or optical cable, by radio or by other means.

Alternatively, the data medium may be an integrated circuit in which the program is incorporated, the circuit being suitable for executing or for use in the execution of the method in question.

The various aforementioned embodiments or implementation features may be added, independently or in combination with one another, to the steps of the prediction method. The servers and devices have at least advantages analogous to those conferred by the method to which they relate.

BRIEF DESCRIPTION OF THE DRAWINGS

Other features and advantages of aspects of the invention will become more clearly apparent from reading the description that follows. This description is purely illustrative and must be read with reference to the attached drawings, in which:

FIG. 1 is a view of an environment suitable for implementing the prediction method according to one particular embodiment, FIG. 2A shows a weather area comprising a road network made up of a set of traffic lanes, FIG. 2B shows the weather area from FIG. 2A divided into a plurality of weather cells, and road segments on which vehicles are travelling, FIG. 3 is a flowchart showing the main steps of the prediction method according to one particular embodiment, FIGS. 4A-4E show a plurality of weather cells through which a road segment extends and a likelihood of precipitation associated with each of the cells, and FIG. 5 is a schematic view of a prediction device 500 according to an embodiment of the invention.

DETAILED DESCRIPTION

FIG. 1 shows a vehicle 100 travelling on a road segment 101. The vehicle 100 comprises an electronic command unit (ECU), to which a plurality of sensors are connected by way of a communication bus, for example a CAN (controller area network) bus. The command unit is further connected to a communication interface 104 allowing the vehicle to exchange messages with a server 107. By way of example, it is a 2G, 3G, 4G, 5G, WiFi or WiMax network interface suitable for setting up a connection to a communication network 105 by way of a cellular access network 106. Thus, the command unit can capture data from various sensors and transmit these data to the server 107 in a message, for example in a json (JavaScript object notation) message, transmitted by means of a suitable transport protocol such as http.

The sensors of the vehicle 100 allow the command unit to determine the activation state of various equipment items of the vehicle, such as for example the activation state of a windshield wiper 102 or of fog lamps 103 of the vehicle, and to transmit such activation or deactivation information to the server 107. The vehicle 100 can comprise other types of sensors, for example a microphone, a thermometer or a rain sensor, allowing a weather condition to be determined in the area in which the vehicle is travelling.

The vehicle also comprises a locating device of GNSS (global navigation satellite system) type, allowing the electronic command unit to know the position of the vehicle and its orientation in a global reference frame. The locating device thus allows the command unit to obtain the longitude and the latitude of the vehicle, along with the direction of movement of the vehicle, and to transmit this information to the server 107 in a suitable message via the communication interface 104.

The server 107 is a processing server suitable for receiving data from vehicles such as the vehicle 100. For this purpose, the server comprises a processor and a memory that stores instructions suitable for execution by the processor. The server further comprises a network interface, for example an Ethernet interface, allowing it to connect to the communication network 105 and to exchange messages with other devices, such as with the vehicle 100 or with other servers.

In particular, the server 107 can exchange messages with a weather forecast server 108. The server 108 is for example a server of a weather forecast provider. Thus, by transmitting a particular request to the server 108, for example comprising an identifier of a geographical area, the server 107 can receive a weather forecast for said geographical area. Such a weather forecast comprises for example probabilities of various weather events occurring, for example probabilities of precipitation associated with types of precipitation. For example the server 108 provides 15-minute weather forecasts for geographical areas, the dimensions of which are in the order of one kilometer, at the request of the server 107.

FIG. 2A shows a map 200 of a road network extending over a particular geographical area. The area shown on the map corresponds to a square having sides of 800 meters, for example. The road network comprises a plurality of road segments 201 to 203, a road segment corresponding to a section of road that is delimited by two intersections. The area shown in FIG. 2A corresponds to a weather area for which the server 108 can provide 15-minute precipitation forecasts when interrogated by the server 107, for example. These forecasts are for example a probability of a weather event of "rain" type occurring in the area. As the forecast is provided for the area generally, it does not allow accurate determination of the probability of rain at a particular location in the road network running through the area.

FIG. 2B shows the same geographical map in which the weather area is subdivided into a plurality of weather cells A1 to H8. The dimensions of these cells are in the order of around one hundred meters per side, for example. A plurality of vehicles 205 moving in the road network in the weather area is also shown in FIG. 2B. By way of example, in cell E3, a vehicle is moving to the right on the segment 203, and another shown in cell B4 is travelling on the segment 202. By way of example, these are vehicles such as the vehicle 100 described with reference to FIG. 1, which are suitable for transmitting data from onboard sensors or from equipment items, and in particular data relating to a change of activation state of an equipment item of the vehicle, to the server 107. Finally, a plurality of weather stations are shown on the ground 204, in cells F3 and B7, which are suitable for making weather observations and transmitting these observations to a server such as the processing server 107. These weather stations allow weather observations at the location of the station, for example a level and/or a type of precipitation or a temperature, to be uploaded to the server. Other means for uploading such an observation can be envisaged, for example sensors of a vehicle travelling in the cell, such as a rain sensor, an exterior thermometer or a sensor for activating a windshield wiper, can be used to upload a weather observation at a particular location to the server. These observations allow the server 107 to be provided with a ground truth concerning weather conditions in a particular cell of the weather area.

The prediction method will now be described with reference to FIG. 3.

In one particular implementation, the method comprises a phase of prior learning, in the course of which a prediction model is trained to predict a weather condition for one or more particular cells of a weather area on the basis of weather forecasts for an area comprising said cell and on the basis of data transmitted by one or more vehicles.

The learning phase comprises a first step 300 in the course of which the server 107 interrogates the weather forecast server 108 in order to receive weather forecasts PREV1 for the area 200. By way of example, such forecasts correspond, for a particular weather area, to probabilities associated with different weather conditions. For example, these may be probabilities of rain, snow, fog, temperatures, etc. The server 107 can interrogate the server 108 on a regular basis in order to obtain up-to-date probabilities, for example every 15 minutes, for different weather areas of a territory. The server 108 can be interrogated by transmitting a request in accordance with a suitable communication protocol, for example http, the request comprising for example an identifier of the geographical area for which the forecast is requested, identified by a geohash. The response from the server 108 can consist of a message in the JSON format comprising the available forecasts for the area.

According to one particular implementation, the server 107 further obtains a weather history from the server 108, the history comprising observations and/or forecasts for a predetermined moving time window, for example a 6-hour window comprising observations for the last four hours and forecasts for the next two hours.

In a step 301, the server 107 receives, from at least one vehicle travelling on a road segment, a first data item OBS1 relating to at least one weather condition encountered at a particular location. On the basis of this location, provided in the form of a longitude and a latitude, the server 107 determines a first weather cell in which the at least one weather condition has been observed. The server 107 receives these data OBS1 via its communication interface. The data received are for example formatted in a message in accordance with the JSON format comprising, apart from the data relating to a weather condition, a geographical location at which the weather condition has been observed. These data are for example transmitted by the vehicles 205 situated in cells B4 and E3 in FIG. 2B.

According to one particular embodiment, the data OBS1 comprise data from sensors of the vehicle, such as for example a temperature obtained by an exterior temperature sensor of the vehicle, or an intensity of precipitation detected by a rain sensor.

In one particular implementation, the data OBS1 comprise an indication relating to a change of weather conditions. The indication relating to a change of weather conditions comprises for example a data item relating to the activation or deactivation of an equipment item of the vehicle, for example the activation, deactivation or a change of speed of a windshield wiper, the activation or deactivation of headlamps, for example fog lamps. The alteration of the activation state of such equipment items allows a weather front to be located, that is to say for example a vehicle entering or exiting an area of rain or a fog bank.

According to another particular embodiment, the data OBS1 further comprise a direction in which the vehicle is travelling. The direction data item is for example determined by a sensor of magnetometer type aboard the vehicle, or else determined on the basis of successive positions obtained by a receiver of GNSS type. The vehicle's direction associated with the data item relating to the activation or deactivation of an equipment item of the vehicle allows the direction in which an area of rain or a fog bank extends to be determined.

Thus, in a preferred embodiment, when a vehicle detects, for example via the CAN (controller area network) bus, that headlamps or a windshield wiper of the vehicle are/is activated, it transmits the corresponding information to the server 107, along with its position and a direction in which it is moving. In this way, when the vehicle enters a rainy area, the server 107 receives information comprising for example a first "active" state, a second "inactive" state of the windshield wiper, a geographical position of the change of state and a direction of movement of the vehicle. This information allows the server to determine the type, the position and the orientation of a weather front, that is to say the location and orientation of a transition between different weather conditions.

In a step 302, the server receives a weather observation OBS2 relating to at least one second cell of the weather area. This observation OBS2 constitutes a ground truth that can be transmitted by one of the fixed weather stations 204 or by a travelling vehicle suitable for transmitting a weather observation, for example one of the vehicles 205. The observation OBS2 can also be signalled by a user, for example by means of a mobile terminal, or by any other suitable means (camera associated with an image analysis device, microphone associated with a signal analysis device). The second cell is a cell adjacent to the first cell, for example a cell belonging to the same weather area, which adjoins the first cell or is separated from the first cell by one or more intermediate cells. Referring to FIG. 2B, cells F3 and B7 are adjacent to cells E3 and B4, respectively.

Preferably, the first data item OBS1 obtained for the first cell in step 301 and the second data item OBS2 obtained in step 302 for the second cell, which is adjacent to the first cell, correspond to observation times that are in one and the same time window, the duration of which is below a predetermined threshold, for example a time window with a duration below a threshold of 15 minutes. As a variant, the threshold can be adaptive and vary according to the distance separating the first cell from the second, adjacent cell. By way of example, the greater the distance separating the first and second cells, the shorter the duration of the time window comprising the corresponding observations. In other words, the duration of the time window is inversely proportional to the distance separating the cells under consideration.

In step 303, the server 107 creates at least one characteristic vector comprising at least the first data item PREV1 concerning the general weather forecast obtained for the weather area in step 300, the second data item OBS1 relating to a weather condition observed by a vehicle 205 in a first cell and obtained in step 301, and a target data item OBS2 relating to a weather observation obtained in step 302 for at least one second weather cell of the weather area. The vector thus constituted is used to train a particular prediction model associated with the cell for which a ground truth has been obtained in step 302 using a suitable supervised learning technique. Of course, the prediction model associated with a particular cell can be trained by a plurality of characteristic vectors comprising data transmitted by a plurality of vehicles at a variety of locations.

In one particular embodiment, a particular prediction model is associated with each of the cells of the weather area and trained to predict a weather condition in the cell with which it is associated.

Thus, the prediction model associated with cell F3 in FIG. 2B can be trained on the basis of a first characteristic vector constituted by a value Pz representative of the probability of a particular weather condition that is forecast for the weather area generally, obtained for example from the server 108, by a value Po(E3) representative of a weather condition or of a change of weather condition observed by a vehicle 205 in cell E3, by an identifier of cell E3 and by a weather observation Pc(F3) relating to cell F3 that is transmitted for example by a weather station 204 or a vehicle travelling in cell F3.

The model associated with cell F3 can also be trained on the basis of a plurality of second characteristic vectors, for example on the basis of a second vector constituted by the value Pz representative of the probability of a particular weather condition that is forecast for the weather area generally, obtained for example from the server 108, by a value Po(B4) representative of a weather condition or of a change of weather condition observed by a vehicle 205 in cell B4, by an identifier of cell B4 and by a weather observation Pc(F3) relating to cell F3 that is transmitted for example by a weather station 204 or a vehicle travelling in cell F3.

Such training allows the model associated with cell F3 to establish correlations between a weather forecast PREV1 for the weather area under consideration, a first weather condition OBS1 observed in a particular cell (preferably a change of weather condition) and a second weather condition OBS2 observed in a target cell. By repeating the training for the prediction models associated with each of the cells of the weather area, a system trained to accurately predict a weather condition in a particular target cell of a weather area under consideration is obtained.

It is further noted that in a preferred implementation, the values Po representative of a weather condition or of a change of weather condition observed in a particular cell by a vehicle 205 serve as ground truth for training the prediction model associated with this particular cell.

In a second phase, called prediction phase, a trained prediction model is used to predict a weather condition PRED in a target cell on the basis of data transmitted by a vehicle travelling in a current cell, and optionally on the basis of a prediction made for an adjacent cell.

To this end, the prediction method comprises a step 304 of obtaining, from a weather forecast provider, a data item PREV2 relating to a general weather forecast for said weather area and a step 305 of receiving, from a first vehicle travelling in a first weather cell, a data item OBS3 relating to an alteration of a weather condition detected by at least one sensor of the vehicle. Steps 304 and 305 correspond to steps 300 and 301 described above and allow the data described above with reference to steps 300 and 301 to be obtained.

In a step 306, the server 107 infers at least one prediction model for the weather area in order to obtain a prediction PRED of a probability of a weather condition for at least one current weather cell. To that end, the server 107 creates a characteristic vector comprising at least the data item PREV2 obtained from the forecast server 108, the data item OBS3 transmitted by a vehicle travelling in a cell adjacent to the current cell, and the identifier of the cell to which the data item OBS3 relates. In one particular implementation, the data item OBS3 is the result of a prediction made beforehand for a cell adjacent to the current cell.

In one particular embodiment, the predicted condition is a weather front. In this case, the characteristic vector used for training the model and for making the prediction can comprise an indication relating to the presence of a weather front in a particular cell. Such a provision takes advantage of the fact that for example when an east-west front is detected in a current cell, the probability of a front of the same type and oriented in a similar manner being present in a cell situated to the north or south of the current cell is high.

Finally, the method comprises a step 307 of transmitting the predicted weather condition to at least one second vehicle. The transmission takes place for example in the form of a weather map comprising predictions made for at least one cell of the weather area under consideration.

Such a method allows a particularly accurate weather map to be obtained, in particular when a plurality of contributing vehicles are travelling in the road network.

Thus, when the server 107 receives an indication from a vehicle according to which a change of weather condition is detected, the server updates the predictions for a set of cells adjacent to the cell in which a change of condition is detected. These new predictions are used to infer the other models of the weather area gradually in order to update a weather map and transmit this updated map to at least one vehicle in a step 307. Such a map allows a vehicle to be accurately informed about the position of a rain front or a fog bank in order for example to configure an equipment item of the vehicle and/or to warn the user. For example, such a map can allow a vehicle to automatically switch on fog lamps at the approach of a fog bank, or else to warn the driver by means of an audible or visual message so that he adjusts his speed.

Another example of implementation of the method will now be described with reference to FIGS. 4A to 4C. The features of this embodiment can be combined with the embodiment described above.

FIGS. 4A to 4C show, in a simplified manner, a single main road 401 in a weather area divided into a set 400 of weather cells denoted A to G through which a road segment 401 passes, along with a vehicle 410, the characteristics of which are similar to those of the vehicle 100 described previously in relation to FIG. 1.

The server 107 comprises a database in which each weather cell A to G is associated with at least one probability of a weather event. The database thus comprises, for each cell A to G, a probability of it raining, a probability of fog, a probability of black ice, etc, or else a probability of the presence of a particular weather front. These probabilities are regularly updated on the basis of forecasts obtained from a weather forecast provider, and on the basis of observations transmitted by travelling vehicles such as the vehicle 410, when they are available. In the absence of an observation from a vehicle, the probability is determined on the basis of the forecasts of the weather forecast provider for the weather area under consideration. In FIG. 4A, in the absence of a data item from a vehicle, probabilities of dry weather, which are represented by a sun associated with each cell A to G, are thus determined on the basis of the forecasts provided by a weather forecast provider.

Referring to FIG. 4B, it is now supposed that the vehicle 410, still travelling in cell B in the direction of cell C, enters a rainy area. On entering the area, the windshield wipers of the vehicle 410 are activated, either by the driver or automatically on account of a rain sensor of the vehicle. Information relating to the activation of a windshield wiper and/or of rain detection by a rain sensor is then transmitted to the server 107 by the vehicle 410 in a suitable message. The message thus comprises the position of the vehicle, for example its latitude and its longitude, the direction in which it is travelling and a characteristic of the weather observation, for example an indicator of activation of the windshield wiper.

On receiving this message, the server 107 determines the cell in which the vehicle is travelling on the basis of the location included in the message and updates the probability of rain associated with this cell. Thus, as a "rain" observation is transmitted by the vehicle 410, the probability of it raining in cell B increases. This probability of it raining in cell B has been represented by a cloud. This updated probability is stored by the server 107 in the database.

Apart from this updated probability of rain, the server 107 also stores in the database a characteristic of the weather observation transmitted by the vehicle. In particular, the server 107 stores a characteristic of a weather front on the basis of the data transmitted by the vehicle. By way of example, on receiving the message transmitted by the vehicle 100, the server determines and stores the existence of a "dry weather" to "rainy weather" transition from west to east in cell B at the location at which the windshield wiper has been activated. Depending on the type of data transmitted by the vehicle, the server can determine other types of weather front, for example the start or end of a fog bank on the basis of the activation or deactivation of the foglamps, the start or end of an area with a risk of black ice on the basis of a change of temperature, etc. Thus, for a cell in which a weather front is detected, the server can store a first value that is representative of the orientation of the front and a second value that is representative of the nature of the transition.

In FIG. 4B, the rain front detected by the vehicle 100 in cell B has been shown by a shaded cell half 402 representing the area of rain, and a light cell half 403 for the dry area.

When the data associated with cell B have been updated in the database, the server 107 updates the probabilities of weather conditions associated with adjacent cells A and C.

In order to update the probability of a weather event of "rain" type in a particular cell, the server 107 uses a prediction model associated with this particular cell and trained beforehand to predict the probability of a "rain" weather event in the particular cell on the basis of a general weather forecast obtained from a weather forecast service for the weather area in which the particular cell is situated, and on the basis of a characteristic of a weather front detected in a cell adjacent to the particular cell.

Thus, to predict a probability of rain in cell C, the server 107 infers the prediction model associated with cell C on the basis of at least the weather forecast obtained from the forecast server 108 for the zone to which the cell belongs and on the basis of the weather characteristic transmitted by the vehicle 410 for cell B. Of course, the server can take other parameters into consideration, in particular probabilities or features of a weather front that are associated with other cells adjacent to cell C, for example associated with cell D.

The prediction model associated with a particular cell is for example an artificial neural network trained in supervised fashion on the basis of data collected for the segment 401. These training data comprise at least:
- a weather forecast and/or history obtained from a provider for the geographical area in which the cell for which a prediction is to be made is located,
- a characteristic of a weather front detected in at least one cell adjacent to the cell for which a prediction is to be made, and
- the learning target, that is to say a weather observation in the cell under consideration obtained for example from a weather station on the ground or by any other suitable means.

Of course, these training data can be processed using statistical tools such as averaging or squaring, allowing statistical features to be highlighted and the best correlations with the learning target to be established. Furthermore, other training data can be used, such as for example predictions made for one or more adjacent cells, or else traffic data such as an average speed of vehicles on one or more road segments passing through the cell under consideration.

By applying such a prediction model to cell C, the server determines that the probability of a "rain" event being in progress in cell C is higher than the probability of dry weather. The reason is that the rain front from left to right detected in cell B makes it probable that the rain event will extend to the adjacent cell C. The result of this prediction is represented by a shaded area 404 in cell C in FIG. 4C. The probability thus determined for cell C is stored in the database of the server 107 and represented by a cloud associated with cell C in FIG. 4C, and can serve as a variable for predictions for other adjacent cells instead of the general predictions for the weather area.

At this stage, the server 107 can construct or update a map on the basis of the weather event probabilities thus updated and can transmit this map to at least one vehicle. To obtain the updated map, a vehicle transmits a message to a download server on which the map is stored, for example, the message including a relevant geographical indication, for example the position of the vehicle. On receiving such a message, the server transmits the map to the vehicle.

FIG. 4D shows the same road segment 401 extending over cells A to G. The vehicle 410 has moved on the segment and is now travelling in cell F. In this example, the server 107 receives a new message from the vehicle 410 comprising data relating to a new weather condition encountered by the vehicle in said first cell. In this example, the message comprises a data item relating to a deactivation of a windshield wiper of the vehicle 410, a location and a direction of the vehicle. The server 107 uses this to deduce the presence of a second weather front characterized by the vehicle crossing from an area of rain to a dry area and stores this information in its database, updates the probability of the "rain" event for cell F and makes a prediction for at least one adjacent cell, for example for cells E and G, on the basis of the prediction models associated with each of these cells. On the basis of the general weather forecasts for the region and/or the previously updated probabilities for these cells, and on the basis of the characteristics of the weather front detected in cell F, that is to say on the basis of the type of transition and the orientation of the front, in this example the server determines that the "rain" event is more probable in cell E than the "dry" event, but that the "dry" event is more probable in cell G than the "rain" event. The server stores these new probabilities in its database in association with the corresponding cells. The shaded areas 405 and 406 in FIG. 4D represent the new areas in which the "rain" event is probable.

By inferring the model associated with cell D, on the basis of the updated probabilities for the adjacent cells B, C, E and F, the server can predict a new probability of rain for cell D as shown in FIG. 4E. The method has thus allowed accurate determination of a rainy area on the segment 401.

FIG. 5 is a schematic view of a prediction device 500 according to one particular embodiment of the invention.

The device 500 comprises a storage space 502, for example a memory MEM, and a processing unit 501 that is for example equipped with a processor PROC. The processing unit can be controlled by a program 503, for example a computer program PGR, implementing the prediction method according to one particular embodiment, and in particular the steps of obtaining, from a weather forecast provider, a first data item PREV2 relating to a general weather forecast for said weather area, receiving, from a first vehicle travelling in a first weather cell, a second data item OBS3 relating to an alteration of a weather condition detected by at least one sensor of the vehicle, predicting a probability PRED of a weather condition for at least one target weather cell by applying a prediction model associated with the target cell to at least the first data item PREV2 and the second data item OBS3, and transmitting the predicted weather condition PRED to at least one second vehicle.

In one particular implementation, the instructions of the computer program PGR are further configured to train a prediction model associated with a particular weather cell by implementing steps of obtaining a third data item PREV1 comprising a general weather forecast relating to said weather area, and obtaining a fourth data item OBS1 relating to an alteration of a weather condition in at least one first cell of the weather area, the alteration being detected at a first time by at least one sensor of a vehicle travelling in the first cell, and training the prediction model on the basis of a characteristic vector comprising at least the third data item PREV1 and the fourth data item OBS1, and on the basis of a target data item OBS2 relating to a weather observation obtained for a second time in the target weather cell of the weather area.

On initialization of the device 500, the instructions of the computer program 503 are for example loaded into a RAM (random access memory) before being executed by the processor of the processing unit 501. The processor of the processing unit 501 implements the steps of the prediction method according to the instructions of the computer program 503.

To that end, apart from the memory and the processor, the device 500 comprises communication means 504, for example an Ethernet network interface, allowing the device to exchange messages with other devices through a communication network, and in particular to make requests to a weather forecast server in order to obtain a forecast and/or a forecast history for a particular geographical area, and to interchange data with vehicles travelling in a road network, in particular to receive weather observations from vehicles and/or from weather stations on the ground, and to transmit weather predictions relating to weather cells to vehicles.

In one particular implementation, the device 500 further comprises a training module 505 suitable for training a prediction model 508. The prediction model is for example an artificial neural network implemented by computer program instructions recorded in the memory 502 of the device. The training module 505 is for example implemented by instructions configured to perform steps 300 to 303 of the prediction method, which are described above with reference to FIG. 3. The device can include a plurality of neural networks associated with each of a plurality of cells of a weather area.

The device 500 comprises a prediction module 507, suitable for predicting a weather condition in a particular cell. The module 507 is for example implemented by computer program instructions recorded in the memory 502 and configured to implement steps 304 to 307 of the prediction method when they are executed by the processor 501.

Finally, in one particular implementation, the device 500 comprises a module 506 suitable for carrying out at least one statistical processing on the observations and forecasts obtained from a forecast server and/or from vehicles and for creating characteristic vectors on the basis of these data in order to train the prediction model and predict a weather condition. The module 506 is for example implemented by computer program instructions recorded in the memory 502.

According to one particular implementation, the device 500 is integrated in a processing server.

The invention claimed is:

1. A method for predicting a weather condition at a particular location in a road network extending over at least one weather area, the method comprising:
    dividing the at least one weather area into a plurality of contiguous weather cells;
    obtaining, from a weather forecast provider, a first data item relating to a general weather forecast for said weather area;
    receiving, from a first vehicle travelling in a first weather cell of the plurality of contiguous weather cells, a second data item relating to an alteration of a weather condition detected by at least one sensor of the first vehicle, the second data item comprising:
        a first activation state of at least one equipment item of the first vehicle,
        a second activation state of the at least one equipment item of the first vehicle, and
        a direction of movement of the first vehicle;
    obtaining a prediction model associated with a second weather cell of the plurality of contiguous weather cells, among a plurality of different prediction models associated respectively with a corresponding weather cell of the plurality of contiguous weather cells, wherein the second weather cell of the plurality of contiguous weather cells is adjacent to the first weather cell of the plurality of contiguous weather cells;
    creating a characteristic vector comprising at least the first data item, the second data item and an identifier of the first weather cell to which the second data item relates;
    predicting a probability of a weather condition for the second weather cell of the plurality of contiguous weather cells by applying the prediction model associated with the second weather cell to the created characteristic vector; and
    transmitting the predicted weather condition to at least one second vehicle.

2. The method as claimed in claim 1, further comprising a prior phase of training the prediction model associated with the second weather cell, the training comprising:
    obtaining a third data item comprising a general weather forecast relating to said weather area;
    obtaining a fourth data item relating to an alteration of a weather condition in the first weather cell of the weather area, the alteration being detected at a first time by at least one sensor of a training vehicle travelling in the first weather cell, the fourth data item comprising:
        a first activation state of at least one equipment item of the training vehicle,
        a second activation state of the at least one equipment item of the training vehicle,
        a direction of movement of the training vehicle; and
    training the prediction model associated with the second weather cell on the basis of a training characteristic vector comprising at least the third data item, the fourth data item and the identifier of the first weather cell to which the fourth data item relates, and on the basis of a target data item relating to a weather observation obtained for a second time in the second weather cell of the weather area.

3. The method as claimed in claim 2, in which the third data item, the fourth data item and the target data item, on the basis of which the prediction model associated with the second weather cell is trained, relate to times in one and the same time window, the duration of which is below a predefined threshold which varies according to a distance separating the first weather cell and the second weather cell.

4. The method as claimed in claim 1, in which the first activation state and the second activation state relate to at least one equipment item of the first vehicle selected from among the equipment items on the following list:
    a windshield wiper of the first vehicle,
    a headlamp of the first vehicle,
    a rain sensor of the first vehicle,
    a microphone.

5. A nonvolatile data medium containing computer program instructions configured to implement the steps of a prediction method as claimed in claim 1 when the instructions are executed by a processor.

6. The method as claimed in claim 1, wherein each weather cell of the plurality of contiguous weather cells has at least one dimension no greater than one kilometer.

7. The method as claimed in claim 1, wherein each weather cell of the plurality of contiguous weather cells has dimensions of one hundred meters.

8. The method as claimed in claim 1, wherein the at least one weather area has a geometric shape with at least one side having a dimension no greater than one kilometer, and wherein each weather cell of the plurality of contiguous weather cells is part of the geometric shape and has at least one side with a dimension of one hundred meters.

9. The method as claimed in claim 1, wherein the first data item and the second data item are obtained at observation times that are in one and the same time window, the duration of said time window being below a predetermined threshold of 15 minutes.

10. The method as claimed in claim 1, wherein the second weather cell is an adjoining weather cell to the first weather cell, or the second weather cell is a weather cell of the plurality of contiguous weather cells separated from the first weather cell by one other weather cell of the plurality of contiguous weather cells.

11. The method as claimed in claim 1, wherein the second weather cell is an adjacent weather cell to the first weather cell when a distance separating the second weather cell from the first weather cell is below a threshold.

12. A device for predicting a weather condition at a particular location in a road network extending over at least one weather area, the device comprising a communication interface, a memory and a processor, the processor and the communication interface being configured by instructions recorded in the memory to implement:
dividing the at least one weather area into a plurality of contiguous weather cells;
obtaining, from a weather forecast provider, a first data item relating to a general weather forecast for said weather area;
receiving, from a first vehicle travelling in a first weather cell of the plurality of contiguous weather cells, a second data item relating to an alteration of a weather condition detected by at least one sensor of the first vehicle, the second data item comprising:
a first activation state of at least one equipment item of the first vehicle,
a second activation state of the at least one equipment item of the first vehicle, and
a direction of movement of the first vehicle, wherein the processor and the communication interface are further configured by instructions recorded in the memory to implement:
obtaining a prediction model associated with a second weather cell of the plurality of contiguous weather cells, among a plurality of different prediction models associated respectively with a corresponding weather cell of the plurality of contiguous weather cells, wherein the second weather cell of the plurality of contiguous weather cells is adjacent to the first weather cell of the plurality of contiguous weather cells;
creating a characteristic vector comprising at least the first data item, the second data item and an identifier of the first weather cell to which the second data item relates;
predicting a probability of a weather condition for the second weather cell of the plurality of contiguous weather cells by applying the prediction model associated with the second weather cell to the created characteristic vector; and
transmitting the predicted weather condition to at least one second vehicle.

13. The device as claimed in claim 12, wherein the processor and the communication interface are further configured by instructions recorded in the memory and suitable for implementing a prior training of the prediction model associated with the second weather cell according to at least the following:
obtaining a third data item comprising a general weather forecast relating to said weather area; and
obtaining a fourth data item relating to an alteration of a weather condition in the first weather cell of the weather area, the alteration being detected at a first time by at least one sensor of a training vehicle travelling in the first weather cell, the fourth data item comprising:
a first activation state of at least one equipment item of the training vehicle,
a second activation state of the at least one equipment item of the training vehicle,
a direction of movement of the training vehicle; and
training the prediction model associated with the second weather cell on the basis of a training characteristic vector comprising at least the third data item, the fourth data item and the identifier of the first weather cell to which the fourth data item relates, and on the basis of a target data item relating to a weather observation obtained for a second time in the second weather cell of the weather area.

14. A server comprising a prediction device as claimed in claim 13.

15. The device as claimed in claim 13, wherein the fourth data item and the target data item, on the basis of which the prediction model associated with the second weather cell is trained, relate to times in one and the same time window, the duration of which is below a predefined threshold which varies according to a distance separating the first weather cell and the second weather cell.

16. A server comprising a prediction device as claimed in claim 12.

17. A method for predicting a weather condition at a particular location in a road network extending over at least one weather area, the method comprising:
dividing the at least one weather area into a plurality of contiguous weather cells;
obtaining, from a weather forecast provider, a first data item relating to a general weather forecast for said weather area;
receiving, from a first vehicle travelling in a first weather cell of the plurality of contiguous weather cells, a second data item relating to an alteration of a weather condition detected by at least one sensor of the first vehicle, the second data item comprising:
a first activation state of at least one equipment item of the first vehicle,
a second activation state of the at least one equipment item of the first vehicle, and
a direction of movement of the first vehicle;
obtaining a prediction model associated with a second weather cell of the plurality of contiguous weather cells, among a plurality of prediction models associated respectively with the plurality of contiguous weather cells, wherein the second weather cell of the plurality of contiguous weather cells is adjacent to the first weather cell of the plurality of contiguous weather cells;
predicting a probability of a weather condition for the second weather cell of the plurality of contiguous weather cells by applying the prediction model associated with the second weather cell to at least the first data item and the second data item; and transmitting the predicted weather condition to at least one second vehicle, wherein the first data item and the second data item are obtained at observation times that are in one and the same time window, the duration of said time window being below a predetermined threshold which varies according to a distance separating the first weather cell and the second weather cell.

* * * * *